United States Patent
Meatto et al.

(10) Patent No.: US 6,679,487 B2
(45) Date of Patent: Jan. 20, 2004

(54) HYBRID LEAF SPRING WITH REINFORCED BOND LINES

(75) Inventors: Frank Meatto, Ridgway, CO (US); Edward Pilpel, Avon, CT (US); D. Michael Gordon, Montrose, CO (US); David C. Gordon, Jr., Montrose, CO (US)

(73) Assignee: Pacific Coast Composites, Montrose, CO (US)

( * ) Notice: Subject to any disclaimer, the term of this patent is extended or adjusted under 35 U.S.C. 154(b) by 0 days.

(21) Appl. No.: 10/102,101

(22) Filed: Mar. 19, 2002

(65) Prior Publication Data

US 2003/0178756 A1 Sep. 25, 2003

(51) Int. Cl.$^7$ .................................................. F16F 1/36
(52) U.S. Cl. ........................................ 267/148; 267/47
(58) Field of Search ..................... 267/30, 36.1, 37.1, 267/37.2, 47, 49, 50; 156/245; 264/136, 258, 263

(56) References Cited

U.S. PATENT DOCUMENTS

| | | | | |
|---|---|---|---|---|
| 4,707,317 A | * | 11/1987 | Epel et al. ................ | 264/136 |
| 4,747,898 A | * | 5/1988 | Woltron .................... | 156/153 |
| 4,894,108 A | * | 1/1990 | Richard et al. ............ | 156/245 |
| 5,087,503 A | * | 2/1992 | Meatto ...................... | 428/162 |
| 6,012,709 A | | 1/2000 | Meatto et al. ............. | 267/36.1 |
| 6,189,904 B1 | * | 2/2001 | Gentry et al. ......... | 280/124.175 |
| 6,461,455 B1 | * | 10/2002 | Meatto et al. ............ | 156/64 |

\* cited by examiner

*Primary Examiner*—Christopher P. Schwartz
(74) *Attorney, Agent, or Firm*—McCormick, Paulding & Huber LLP

(57) ABSTRACT

A hybrid leaf spring includes an elongated primary leaf having a compression surface, an opposite tension surface, and a first modulus of elasticity. At least one composite material layer is provided having a second modulus of elasticity different from the first modulus of elasticity. An adhesive layer is interposed between and bonds the at least one composite material layer to and in substantially parallel relationship with a respective one of the tension and compression surfaces of the elongated primary leaf. A reinforcing layer of natural, synthetic or metallic sheet material extends within the adhesive layer, preferably in spaced relation to opposing surfaces of the primary leaf and the composite material layer to strengthen the bond formed by the adhesive layer.

42 Claims, 2 Drawing Sheets

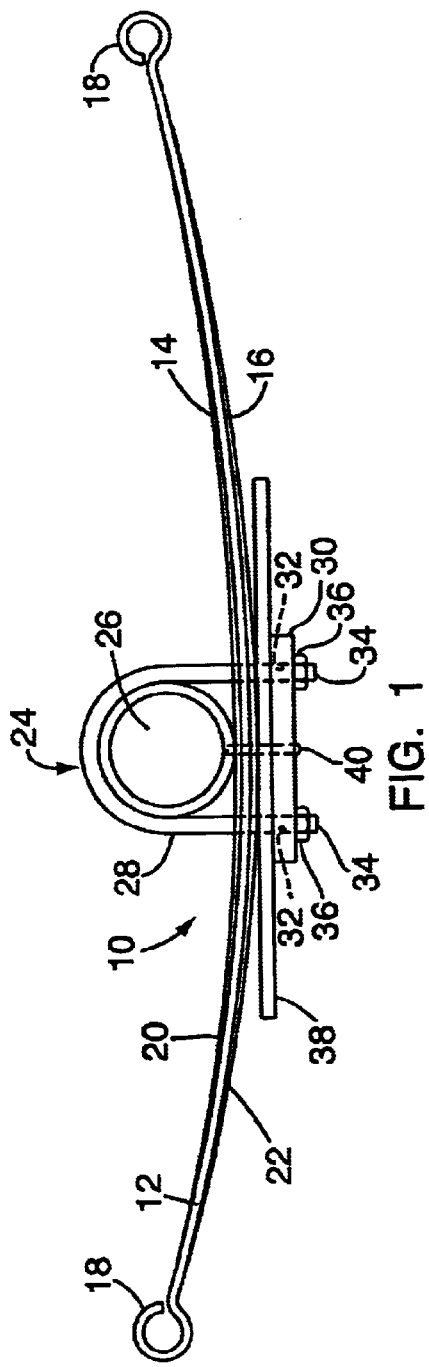
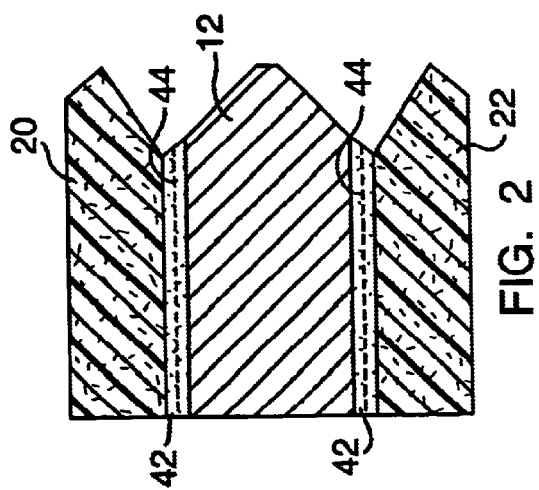

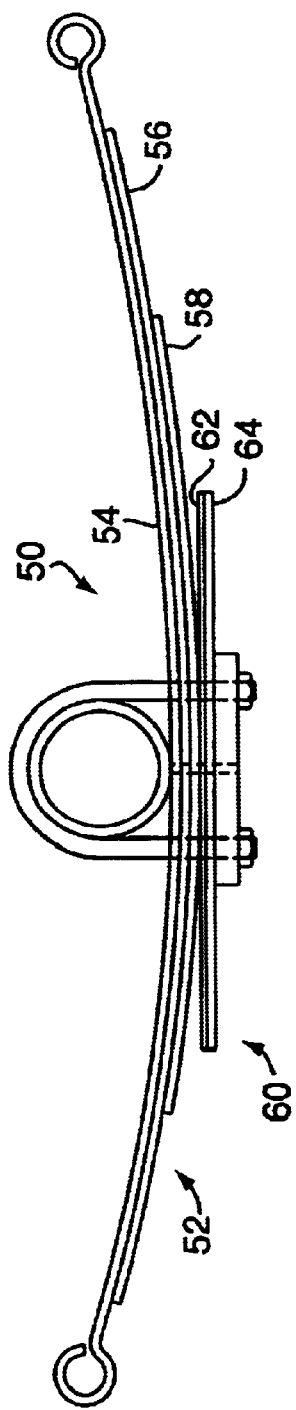
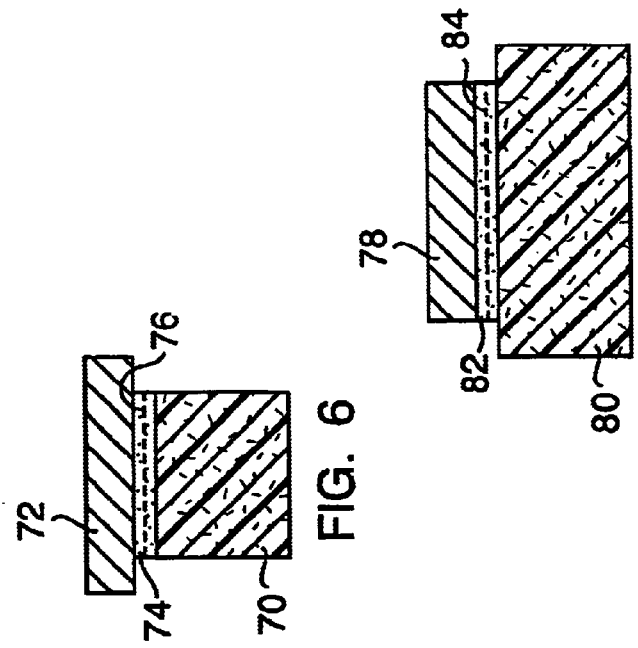

HYBRID LEAF SPRING WITH REINFORCED BOND LINES

FIELD OF THE INVENTION

This invention relates generally to vehicle suspension systems, and more particularly to hybrid leaf springs incorporating reinforced bond lines between leaf spring layers.

BACKGROUND OF THE INVENTION

Known leaf springs are constructed from several elongated strips or leaves of metal stacked one-on-top-of-the-other in a substantially parallel relationship and then clamped together. Typically, these springs are employed in vehicle suspension systems in one of two different load carrying configurations, cantilevered, or three-point-bending—the latter being the more common method of use. A cantilevered leaf spring is one where the leaf spring is fixed or supported at one end to the frame of a vehicle and coupled to an axle at its other end. Alternatively, a leaf spring mounted in three-point-bending is supported or fixed at one end to a structure with the other end mounted such that it can float, and the load is supported by the spring between its two ends. The use of leaf springs mounted in three point bending is so widespread that the Society of Automotive Engineers (SAE) has developed a formal leaf spring design and use procedure.

Metal leaf springs constructed in the manner described above are incorporated into a variety of different vehicle suspensions including, automobiles, light to heavy trucks, trailers, construction equipment, locomotives, and railroad cars. They are also employed in recreational vehicles, such as bicycles, snowmobiles, and ATV's (all terrain vehicles). The leaf springs mounted on the vehicles listed above, function to improve the smoothness of the vehicle's ride and to absorb and store energy for release in response to bending and/or impact loads imposed on the spring resulting from such things as encountering obstructions in a road during the vehicle's operation.

The mechanical properties defining a vehicle suspension system, particularly the spring rate and static deflection of the leaf springs, directly influence the smoothness of the vehicle's ride. Generally, a smooth ride requires the leaf springs to have large static deflections. The smoothness of the ride is also influenced by the vibration damping characteristics of the leaf springs. Damping is a parameter that quantifies the ability of the leaf spring to dissipate vibratory energy. Therefore, a high degree of damping is desirable in leaf springs used in automobiles to minimize the vibratory amplitudes transferred to the passenger area.

The ability to accurately determine the mechanical properties and performance characteristics of a leaf spring is critical to the proper design of vehicle suspension systems. One of the problems resulting from the construction of conventional leaf springs is that the variable lengths of the stack of individual leaves creates a stepped spring construction that only approximates constant stress, the steps tend to create localized areas of high stress known as stress concentrations which detrimentally affect the load carrying capability and useful life of the leaf spring. In addition, the fact that the springs are composed of lengths of metal stacked one-on-top-of-the-other causes them to be quite heavy, this additional weight causes a concomitant reduction in fuel economy.

Moreover, because it is impossible to predict the exact conditions and stresses that a leaf spring will be subjected to, the fatigue life of the spring is generally limited. This problem is further exacerbated by the build-up of foreign material on and between the individual leaves. Not only does this cause corrosion, thereby weakening the leaf spring and making it more susceptible to fatigue failure, but it also affects the stiffness of the leaf spring and hence the smoothness of the ride of the vehicle in which the spring is employed. Generally the magnitude of the contribution made to the strength of a particular leaf spring due to inter-leaf friction is determined empirically. When foreign material gets between the leaves it can dramatically increase, in the case of particulate matter, or decrease, in the case of oil, the friction between the leaves, thereby altering the original mechanical properties of the spring. In addition, the shear conductivity between the leaves, which is a measure of the amount of shear stress transferred from leaf-to-leaf, is typically low in conventional leaf springs because the individual leaves are only clamped at the ends. Therefore, the stress transfer capability along the length of the spring is dependent on the aforementioned inter-leaf friction.

In many applications, leaf springs are loaded not only by vertical forces but also by horizontal forces and torques in the longitudinal vertical and transverse vertical planes. These forces are typically generated when the brakes on the vehicle incorporating the leaf spring are applied. The aforementioned horizontal forces and torques cause the leaf spring to assume an "S" shaped configuration, a phenomena referred to as "S-ing". The stresses induced in the spring when this occurs can be quite high. In order to minimize S-ing in a leaf spring, the stiffness of the spring must be increased, however, this can detrimentally affect the smoothness of a vehicle's ride.

In order to address the above-described problems, those skilled in the art have attempted to fabricate purely composite leaf springs, wherein the individual leaves are formed from a composite material of the type consisting of a plurality of fibers embedded in a polymeric matrix. However, while these springs offered significant reductions in weight, as well as increased fatigue life and damping, their cost was prohibitive. The composite springs were also difficult to attach to the frame of a vehicle and required the use of special adapters.

This inventor developed a hybrid leaf spring to answer the above-mentioned drawbacks as set forth in U.S. Pat. No. 6,012,709, the disclosure of which is herein incorporated by reference. The hybrid leaf spring includes an elongated primary leaf element having a first modulus of elasticity. One or more layers of composite material is bonded to the primary leaf element in order to provide a light weight, durable and cost effective leaf spring having anti-S-ing capability and increased shear conductivity.

However, as a result of more stringent product fatigue durability requirements, there is a need to improve the bond strength between layers of the hybrid leaf spring.

Based on the foregoing, it is a general object of the present invention to provide a leaf spring that overcomes the difficulties and drawbacks of prior art leaf springs.

It is a more specific object of the present invention to provide a hybrid leaf spring with improved bond strength and fatigue properties.

SUMMARY OF THE INVENTION

In a first aspect of the present invention, a hybrid leaf spring includes an elongated primary leaf having a compression surface, an opposite tension surface, and a first modulus of elasticity. At least one composite material layer is provided having a second modulus of elasticity different from the first modulus of elasticity. An adhesive layer is interposed between and bonds the at least one composite material layer to and in substantially parallel relationship with a respective one of the tension and compression surfaces of the elongated primary leaf. A reinforcing layer of sheet material extends within the adhesive layer, preferably in spaced relation to opposing surfaces of the primary leaf and the composite material layer to strengthen the bond formed by the adhesive layer.

In a second aspect of the present invention, a hybrid leaf spring includes an elongated main spring component, and a second stage or overload spring component coupled thereto. The second stage or overload spring component includes a composite material layer, a metallic layer having a thickness less than that of the composite material layer, and an adhesive layer interposed between and bonding the composite material layer to the metallic layer. A layer of reinforcing sheet material extends within the adhesive layer, preferably in spaced relation to opposing surfaces of the composite material layer and the metallic layer of the second stage or overload spring component to strengthen the bond formed by the adhesive layer.

BRIEF DESCRIPTION OF THE DRAWINGS

FIG. 1 is a front elevational view of a hybrid leaf spring in accordance with a first embodiment of the present invention.

FIG. 2 is an enlarged, fragmentary view of the primary leaf element, the composite material layers and the adhesive layers of the hybrid leaf spring of FIG. 1.

FIG. 3 is a cross-sectional, front elevational view of a hybrid leaf spring in accordance with a second embodiment of the present invention.

FIG. 4 is an enlarged fragmentary view of the second stage or overload leaf of the hybrid leaf spring of FIG. 3.

FIG. 5 is a view of the second stage or overload leaf of FIG. 4 taken along the lines 5—5.

FIG. 6 is a cross-sectional view showing a second embodiment of the second stage or overload leaf.

FIG. 7 is a cross-sectional view showing a third embodiment of the second stage or overload leaf.

DETAILED DESCRIPTION OF THE PREFERRED EMBODIMENTS

With reference to FIG. 1, a hybrid leaf spring in accordance with a first embodiment of the present invention is generally designated by the reference number 10. The hybrid leaf spring 10 includes an elongated primary leaf 12 having a first modulus of elasticity, a tension surface 14, an opposing compression surface 16, and mounting means 18, shown as, but not limited to, mounting eyes formed integrally with the ends of the elongated primary leaf for coupling the primary leaf to a vehicle frame. The elongated primary leaf 12 is formed from a suitable material, such as but not limited to metal, preferably steel. Alternatively, the primary leaf 12 may be fabricated from a metal-matrix-composite material which can include a plurality of fibers imbedded in a metallic matrix.

At least one layer of composite material generally, but not limited to, having an elastic modulus lower than the material of the primary leaf, is disposed substantially parallel to and bonded to one of the tension surface 14 and the compression surface 16 of the primary leaf 12. The at least one layer of composite material is preferably formed from a plurality of substantially parallel fibers embedded in a polymeric matrix. As shown in FIG. 1, a first layer of composite material 20 is bonded to the tension surface 14 of the primary leaf 12, and a second layer of composite material 22 is bonded to the compression surface 16 of the primary leaf.

The hybrid leaf spring 10 is preferably fabricated by bonding the first layer of composite material 20 and the second layer of composite material 22 to the primary leaf 12 and placing the assembled components in a press employing a heated die having a shape conforming to the desired unloaded shape of the finished hybrid leaf spring. The components are then pressed together and through the combination of heat and pressure hybrid leaf springs of consistent repeatable shape can be formed. However, the present invention is not limited in this regard as other fabrication techniques known to those skilled in the pertinent art, such as molding, may be employed.

A clamping means 24 is employed to couple the leaf spring 10 in a three-point configuration to an axle 26 of a vehicle. In the illustrated embodiment, the clamping means 24 includes a pair of U-bolts 28 extending around the axle 26 with the leaf spring 10 being received between the U-bolts. A locking plate 30 defining two pairs of apertures 32 for receiving ends 34 of the U-bolts 28 is positioned adjacent to the second layer of composite material 22 and fastening means 36 are threadably engaged with the ends of the U-bolts for releasably clamping the U-bolts and the leaf spring 10 onto the axle 26. In addition, a load leaf 38 for enhancing the load carrying capacity of the leaf spring 10 in the area of highest stress is interposed between the second layer of composite material 22 and the locking plate 30. The load leaf 38 can be bonded to the second layer of composite material 22 or it can be retained in contact with the second layer of composite material by the clamping means 24. The load leaf 38 can be either curved or flat and constructed of either a metallic or composite material or both.

In order to properly position the leaf spring 10 along the axle 26, positioning means 40 is engaged with the axle, and in the illustrated embodiment extends through the leaf spring 10, the load leaf 38, and the locking plate 30 and into the axle 26 thereby fixing the position of the leaf spring relative to the axle. The positioning means 40 may take various forms, and in the illustrated embodiment is a pin; however, a bolt can also be used without departing from the scope of the present invention.

As shown in FIG. 2, to increase bond strength, adhesive layers 42 interposed between the primary leaf 12 and each of the first and second composite layers 20, 22 each includes a reinforcing layer of sheet material 44, schematically indicated by dashed lines, disposed within the adhesive layer. Each adhesive layer 42 is preferably a thermoset epoxy adhesive, but may be other types of adhesive without departing from the scope of the present invention. For example, the adhesive may be traditional one or two part liquid structural adhesives such as epoxies, or may be urethanes and thermoplastics.

The reinforcing layer of sheet material 44 extends within the adhesive layer 42, preferably in spaced relation to opposing surfaces of the elongated primary leaf 12 and the associated layer of composite material so that adhesive is present on both faces of the reinforcing layer of sheet material. More preferably, the reinforcing layer of sheet material 44 is spaced generally equidistantly from the opposing surfaces of the primary leaf 12 and the associated layer of composite material. However, the reinforcing layer of sheet material 44 may be disposed adjacent to or may abut an opposing surface without departing from the scope of the present invention. A primary function of the reinforcing layer of sheet material 44 is to create a bond line or adhesive film of substantial thickness, and to strengthen the adhesive layer. The reinforcing layer of sheet material 44 may for example, be a 50/50 woven glass fabric and a weft fabric (glass fibers in the warp direction). In other words, the ratio of the number of warp threads to weft threads over a predetermined distance along respective axes extending in directions transverse to that of the threads is 50/50. The spacing may be accomplished by other fabric configurations such as for example, 90/10, 80/20, 70/30, 60/40, 40/60, 30/70, 20/80, 10/90, or a random fiber configuration without departing from the scope of the present invention. Moreover, the reinforcing layer of sheet material may comprise other materials such as polyester and carbon fibers within the scope of the present invention. The mediation of the bond line and the strength requirements will determine the type of reinforcing layer of sheet material needed. Typically, a higher rate spring, larger camber and higher stress leaf spring will require the most mediation strength. Less critical applications require less reinforcing sheet material in the mediated layer, and in some cases none at all.

For a higher rate spring and therefore generally higher bond line shear, the composite layers may be designed in a manner that the compression side is generally thicker than the tensile side such that the neutral axis is shifted toward the compression side of the primary leaf 12. The reduction in shear stress at the tension side of the bond line and the ability to absorb strain differential between materials of different Young's Modulus have been discovered to increase fatigue life, particularly on springs with relatively high spring rates.

With reference to FIGS. 3–5, a hybrid leaf spring in accordance with a second embodiment of the present invention is generally designated by the reference number 50. Like elements with the above-described embodiment will be designated by like reference numbers.

A hybrid leaf spring may be used with a traditional steel main leaf. As shown in the embodiment of FIGS. 3–5, the hybrid leaf spring 50 includes a main spring 52 fabricated from metal such as steel. The main spring 52 comprises a plurality of primary leaf elements, such as first, second and third primary leaf elements 54, 56 and 58, respectively. A second stage or overload leaf 60 has a metallic layer 62, such as steel, mounted on and having a thickness that is substantially less than that of a composite layer 64. An adhesive layer 66 is interposed between and bonds the metallic layer 62 to the composite layer 64 of the second stage or overload leaf 60. The adhesive layer 66 may incorporate a reinforcing layer of sheet material 68, or may be manufactured without the reinforcing layer.

Other types of leaf springs may be configured with a one or two sided mediated bond line, wet application with thermoplastic or fiber placement (i.e., tape laying or filament winding). The metallic or steel layer is the resistance heater during the bonding curing process of the adhesive, wet lay-up or consolidation of thermoplastic fibers and is the interface wear layer to the adjacent steel main spring pack or steel monoleaf.

With reference to FIG. 6, in order to further reduce weight and the cost of an overload leaf employed in a hybrid second stage spring (or monoleaf hybrid leaf spring), the width of a composite layer 70 is less than that of a steel layer 72 bonded thereon by an adhesive layer 74 having a reinforcing layer of sheet material 76 disposed within the adhesive layer. The equivalent stiffness may be compensated by increasing the thickness of the composite and steel layers 70, 72 via basic material mechanics that are well-known to those skilled in the pertinent art.

Alternatively as shown in FIG. 7, the width of a steel layer 78 of an overload leaf is less than that of a composite layer 80, and the stiffness compensated by increasing the width or thickness of the composite layer or by increasing the thickness of the steel. The composite and steel layers 80, 78 are joined by adhesive layer 82 having a reinforcing layer of sheet material 84 disposed within the adhesive layer.

Woven or cross strength fibers in the composite material or fiberclad portion of the hybrid spring structure may be provided to counteract the transverse forces due to the Poisson effect. These forces result in longitudinal cracking of the composite material and can ultimately result in splitting and debonding a lengthwise section of the composite layer. The transverse or fiberclad woven layer can be fabricated from, but not limited to, glass, carbon, Kevlar and other synthetic fibers, and may be in the form of, but not limited to, woven material having weft and random fiber configurations.

Use of composites other than pre-cured unidirectional composites may include, for example, filament winding via thermoset, heat cured, electron beam or ultraviolet curing techniques; thermoplastics; tape lying angle and flat; wet wrap of fabric at angles; and press form of thermoplastic bar stock.

While preferred embodiments have been shown and described, various modifications and substitutions may be made without departing from the spirit and scope of the present invention. Accordingly, it is to be understood that the present invention has been described by way of illustration rather than by way of limitation.

What is claimed is:

1. A hybrid leaf spring comprising:
    an elongated primary leaf having a compression surface, an opposite tension surface, and a first modulus of elasticity;
    at least one composite material layer having a second modulus of elasticity different from the first modulus of elasticity;
    an adhesive layer interposed between and bonding the at least one composite material layer to and in substantially parallel relationship with a respective one of the tension and compression surfaces of the elongated primary leaf; and
    a reinforcing layer of sheet material including a woven fabric extending within the adhesive layer and interposed between opposing surfaces of the primary leaf and the composite material layer.

2. A hybrid leaf spring as defined in claim 1, wherein the reinforcing layer of sheet material extends within the adhesive layer in spaced relation to the opposing surfaces of the primary leaf and the composite material layer.

3. A hybrid leaf spring as defined in claim 1, wherein the reinforcing layer of sheet material is generally spaced equidistantly from the opposing surfaces of the primary leaf and the composite material layer.

4. A hybrid leaf spring as defined in claim 1, wherein the woven material includes a natural fiber.

5. A hybrid leaf spring as defined in claim 1, wherein the woven material includes a synthetic fiber.

6. A hybrid leaf spring as defined in claim 1, wherein the woven material includes a glass fiber.

7. A hybrid leaf spring as defined in claim 1, wherein the woven material includes a polyester fiber.

8. A hybrid leaf spring as defined in claim 1, wherein the woven material includes carbon fibers.

9. A hybrid leaf spring as defined in claim 1, wherein the woven material includes mineral fibers.

10. A hybrid leaf spring as defined in claim 1, wherein the ratio of the number of warp threads to weft threads of the woven material over a predetermined distance along respective axes extending in directions transverse to that of the threads is 90/10.

11. A hybrid leaf spring as defined in claim 1, wherein the ratio of the number of warp threads to weft threads of the woven material over a predetermined distance along respective axes extending in directions transverse to that of the threads is 80/20.

12. A hybrid leaf spring as defined in claim 1, wherein the ratio of the number of warp threads to weft threads of the woven material over a predetermined distance along respective axes extending in directions transverse to that of the threads is 70/30.

13. A hybrid leaf spring as defined in claim 1, wherein the ratio of the number of warp threads to weft threads of the woven material over a predetermined distance along respective axes extending in directions transverse to that of the threads is 60/40.

14. A hybrid leaf spring as defined in claim 1, wherein the ratio of the number of warp threads to weft threads of the woven material over a predetermined distance along respective axes extending in directions transverse to that of the threads is 50/50.

15. A hybrid leaf spring as defined in claim 1, wherein the ratio of the number of warp threads to weft threads of the woven material over a predetermined distance along respective axes extending in directions transverse to that of the threads is 40/60.

16. A hybrid leaf spring as defined in claim 1, wherein the ratio of the number of warp threads to weft threads of the woven material over a predetermined distance along respective axes extending in directions transverse to that of the threads is 30/70.

17. A hybrid leaf spring as defined in claim 1, wherein the ratio of the number of warp threads to weft threads of the woven material over a predetermined distance along respective axes extending in directions transverse to that of the threads is 20/80.

18. A hybrid leaf spring as defined in claim 1, wherein the ratio of the number of warp threads to weft threads of the woven material over a predetermined distance along respective axes extending in directions transverse to that of the threads is 10/90.

19. A hybrid leaf spring as defined in claim 1, wherein the ratio of the number of warp threads to weft threads of the woven material over a predetermined distance along respective axes extending in directions transverse to that of the threads is a random configuration.

20. A hybrid leaf spring comprising:
an elongated main spring component; and
an overload spring component coupled to the main spring component, the overload spring component including:
a composite material layer having a first thickness;
a metallic layer having a second thickness different from that of the first thickness of the composite material layer;
an adhesive layer interposed between and bonding together the composite material layer and the metallic layer; and
a reinforcing layer of sheet material including a woven fabric extending within the adhesive layer and interposed between opposing surfaces of the composite material layer and the metallic layer of the overload spring component.

21. A hybrid leaf spring as defined in claim 20, wherein the first thickness of the composite layer is greater than the second thickness of the metallic layer.

22. A hybrid leaf spring as defined in claim 20, wherein the first thickness of the composite layer is less than the second thickness of the metallic layer.

23. A hybrid leaf spring as defined in claim 20, wherein the reinforcing layer of sheet material extends within the adhesive layer in spaced relation to the opposing surfaces of the composite material layer and the metallic layer of the overload spring component.

24. A hybrid leaf spring as defined in claim 20, wherein the reinforcing layer of sheet material is generally spaced equidistantly from the opposing surfaces of the composite material layer and the metallic layer of the overload spring component.

25. A hybrid leaf spring as defined in claim 20, wherein the woven material includes a natural fiber.

26. A hybrid leaf spring as defined in claim 20, wherein the woven material includes a synthetic fiber.

27. A hybrid leaf spring as defined in claim 20, wherein the woven material includes a glass fiber.

28. A hybrid leaf spring as defined in claim 20, wherein the woven material includes a polyester fiber.

29. A hybrid leaf spring as defined in claim 20, wherein the woven material includes carbon fibers.

30. A hybrid leaf spring as defined in claim 20, wherein the woven material includes mineral fibers.

31. A hybrid leaf spring as defined in claim 20, wherein the ratio of the number of warp threads to weft threads of the woven material over a predetermined distance along respective axes extending in directions transverse to that of the threads is 90/10.

32. A hybrid leaf spring as defined in claim 20, wherein the ratio of the number of warp threads to weft threads of the woven material over a predetermined distance along respective axes extending in directions transverse to that of the threads is 80/20.

33. A hybrid leaf spring as defined in claim 20, wherein the ratio of the number of warp threads to weft threads of the woven material over a predetermined distance along respective axes extending in directions transverse to that of the threads is 70/30.

34. A hybrid leaf spring as defined in claim 20, wherein the ratio of the number of warp threads to weft threads of the woven material over a predetermined distance along respective axes extending in directions transverse to that of the threads is 60/40.

35. A hybrid leaf spring as defined in claim 20, wherein the ratio of the number of warp threads to weft threads of the woven material over a predetermined distance along respective axes extending in directions transverse to that of the threads is 50/50.

36. A hybrid leaf spring as defined in claim 20, wherein the ratio of the number of warp threads to weft threads of the woven material over a predetermined distance along respective axes extending in directions transverse to that of the threads is 40/60.

37. A hybrid leaf spring as defined in claim 20, wherein the ratio of the number of warp threads to weft threads of the woven material over a predetermined distance along respective axes extending in directions transverse to that of the threads is 30/70.

38. A hybrid leaf spring as defined in claim 20, wherein the ratio of the number of warp threads to weft threads of the woven material over a predetermined distance along respective axes extending in directions transverse to that of the threads is 20/80.

39. A hybrid leaf spring as defined in claim 20, wherein the ratio of the number of warp threads to weft threads of the woven material over a predetermined distance along respective axes extending in directions transverse to that of the threads is 10/90.

40. A hybrid leaf spring as defined in claim 20, wherein the ratio of the number of warp threads to weft threads of the woven material over a predetermined distance along respective axes extending in directions transverse to that of the threads is a random configuration.

41. A hybrid leaf spring as defined in claim 20, wherein the width of the composite material layer is less than that of the metallic layer.

42. A hybrid leaf spring as defined in claim 20, wherein the width of the metallic layer is less than that of the composite material layer.

* * * * *